United States Patent
Chen et al.

(10) Patent No.: US 8,950,830 B2
(45) Date of Patent: Feb. 10, 2015

(54) ENCLOSURE WITH DETACHABLE TOP PANEL

(75) Inventors: Yun-Lung Chen, New Taipei (TW); Chung Chai, New Taipei (TW); Da-Long Sun, Wuhan (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 193 days.

(21) Appl. No.: 13/592,584

(22) Filed: Aug. 23, 2012

(65) Prior Publication Data

US 2013/0146596 A1    Jun. 13, 2013

(51) Int. Cl.
*G06F 1/16* (2006.01)

(52) U.S. Cl.
USPC .................................. 312/223.2; 312/263

(58) Field of Classification Search
CPC ............ G06F 1/16; H05K 5/00; A47B 81/00; A47B 97/00
USPC ................... 220/262; 174/520; 292/202, 228; 312/223.2, 263, 265.6, 315, 242, 215
See application file for complete search history.

(56) References Cited

U.S. PATENT DOCUMENTS

| | | | |
|---|---|---|---|
| 3,743,336 A * | 7/1973 | Andrews | 292/173 |
| 6,109,669 A * | 8/2000 | Pinkow | 292/175 |
| 6,398,325 B1 * | 6/2002 | Chen et al. | 312/223.2 |
| 6,626,472 B1 * | 9/2003 | Berg | 292/336.3 |
| 6,698,853 B2 * | 3/2004 | Chen et al. | 312/263 |
| 6,721,183 B1 * | 4/2004 | Chen et al. | 361/726 |
| 6,929,338 B2 * | 8/2005 | Chang | 312/223.2 |
| 7,252,351 B2 * | 8/2007 | Chen et al. | 312/223.2 |
| 7,486,506 B2 * | 2/2009 | Chen et al. | 361/679.02 |
| 7,614,672 B2 * | 11/2009 | Smith et al. | 292/336.3 |
| 7,758,133 B2 * | 7/2010 | Chen et al. | 312/223.2 |
| 8,118,377 B2 * | 2/2012 | Chen et al. | 312/223.2 |
| 8,540,327 B2 * | 9/2013 | Chen et al. | 312/223.2 |
| 8,757,675 B2 * | 6/2014 | Loret de Mola | 292/170 |
| 2002/0163205 A1 * | 11/2002 | Sekulovic | 292/163 |
| 2005/0023023 A1 * | 2/2005 | Fan et al. | 174/66 |
| 2005/0023943 A1 * | 2/2005 | Fan et al. | 312/223.2 |
| 2007/0215616 A1 * | 9/2007 | Chen et al. | 220/4.28 |
| 2007/0217137 A1 * | 9/2007 | Chen et al. | 361/683 |
| 2007/0222347 A1 * | 9/2007 | Chen et al. | 312/223.2 |
| 2010/0223761 A1 * | 9/2010 | Chen et al. | 24/1 |
| 2011/0272306 A1 * | 11/2011 | Chen | 206/320 |
| 2011/0273067 A1 * | 11/2011 | Chen | 312/223.1 |
| 2013/0146351 A1 * | 6/2013 | Chen et al. | 174/520 |
| 2013/0147323 A1 * | 6/2013 | Chen et al. | 312/223.1 |
| 2013/0147324 A1 * | 6/2013 | Chen et al. | 312/223.1 |
| 2014/0028164 A1 * | 1/2014 | Chen et al. | 312/223.2 |

* cited by examiner

*Primary Examiner* — Anthony Stashick
*Assistant Examiner* — Ernesto Grano
(74) *Attorney, Agent, or Firm* — Novak Druce Connolly Bove + Quigg LLP

(57) ABSTRACT

An enclosure includes a chassis, a locking member, a top panel and a detaching member. The chassis includes a rear wall. The locking member is attached to the rear wall. The top panel is attached to the chassis. The top panel includes a hook. A through opening is defined in the top panel. The detaching member is rotatable relative to the top panel. The detaching member includes a tab and an operating portion. The detaching member extends through the through opening. The tab and the operating portion are located at opposite sides of the top panel.

17 Claims, 6 Drawing Sheets

ENCLOSURE WITH DETACHABLE TOP PANEL

BACKGROUND

1. Technical Field

The present disclosure relates to computer enclosures with a detachable top panel.

2. Description of Related Art

A computer enclosure usually includes a chassis and a top panel mounted to the chassis. The top panel is often mounted to the chassis through fasteners, such as screws. However, an additional fastener driver is needed, and the fastening process is laborious and time-consuming.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
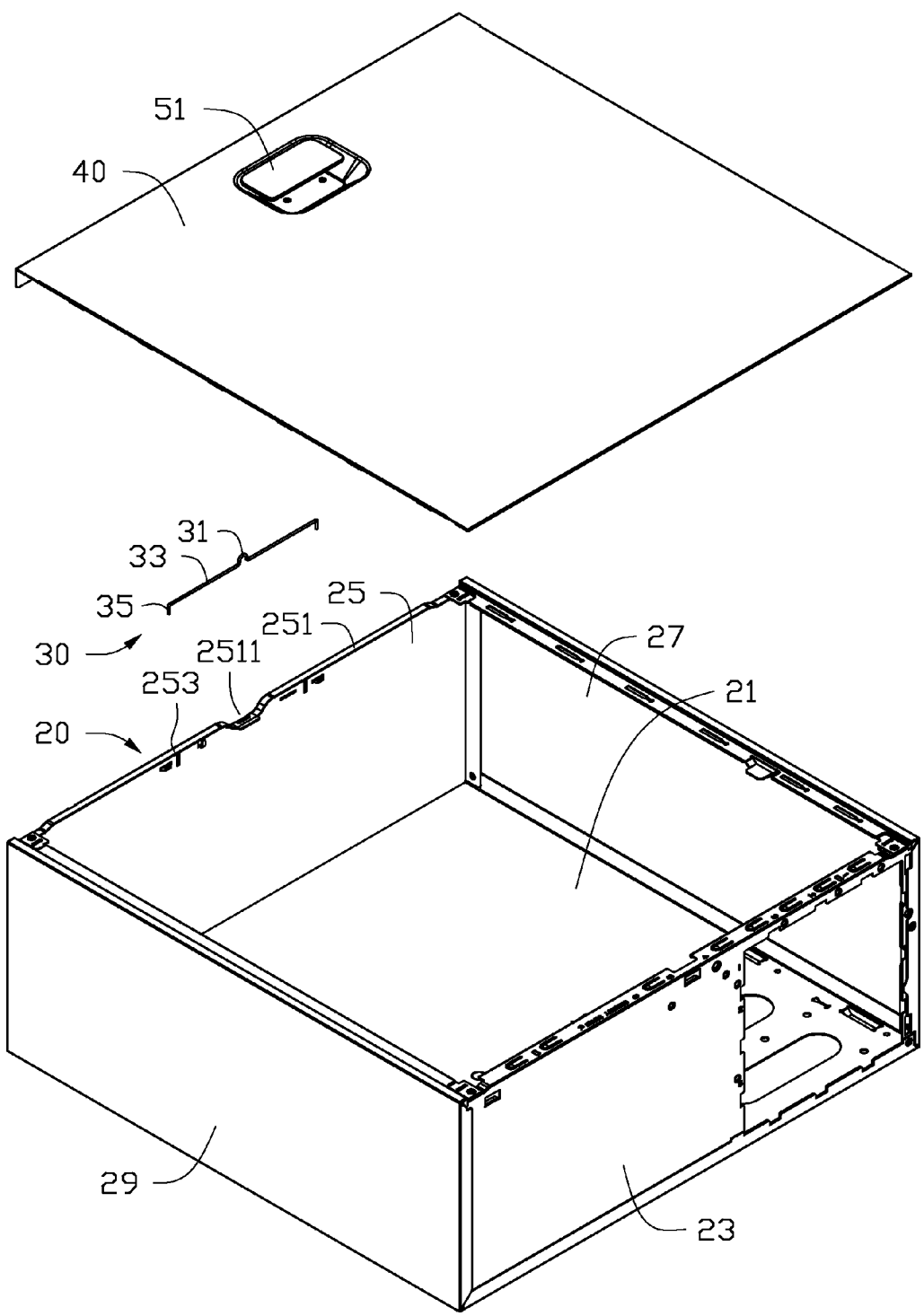
FIG. 1 is a partially exploded isometric view of one embodiment of an enclosure.
Figure 2:
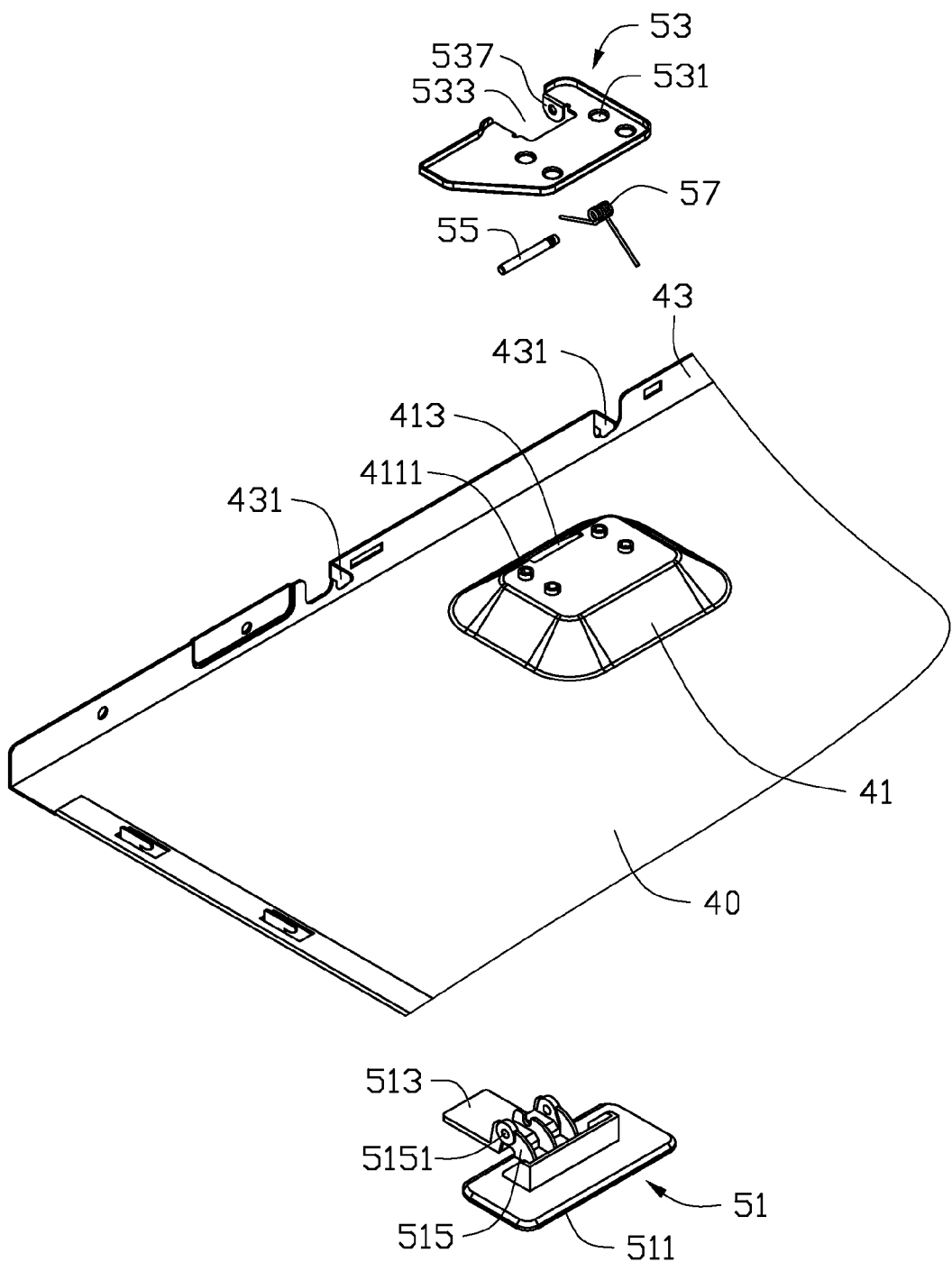
FIG. 2 is an exploded isometric view of one embodiment of a top panel, a mounting member, and a detaching member.

FIG. 1 and FIG. 2 illustrate one embodiment of an enclosure. The enclosure includes a chassis 20, a locking member 30 attached to the chassis 20, a top panel 40, a detaching member 51, and a mounting member 53.

Figure 4:
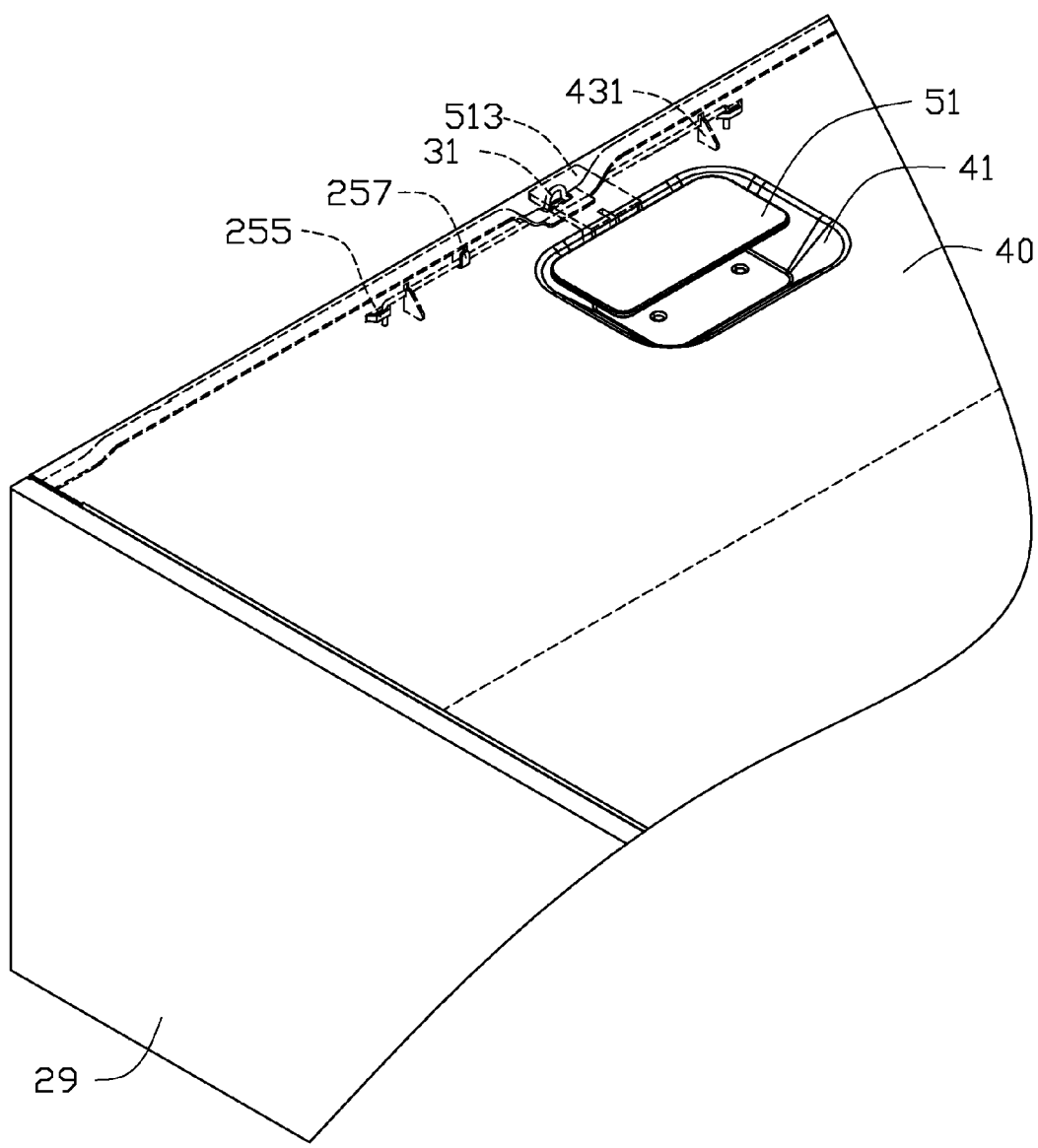
FIG. 4 is a partially assembled view of the enclosure of FIG. 1.

The chassis 10 includes a bottom wall 21, a front wall 23, a rear wall 25, a first sidewall 27, and a second sidewall 29. A rear flange 251 is located on a top edge of the rear wall 21. Referring also to FIG. 4, the rear wall 21 defines two locking holes 253. Two lifting portions 257 and two bridges 255 are located on an inner side of the rear wall 25. The rear wall 21 defines a recess 2511 at a top edge thereof.

In one embodiment, the locking member 30 is linear. The locking member 30 includes a pressing portion 31, two engaging portions 33 at two sides of the pressing portion 31, and two hooking ends 35 located at two free distal ends of the engaging portions 33. The locking member 30 is resilient.

A locking flange 43 is located on a side of the top panel 40. The locking flange 43 is substantially perpendicular to the panel 40. Two hooks 431 are located on the locking flange 43, and extend towards a direction substantially perpendicular to the locking flange 43. The top panel 40 defines a recess portion 41. The recess portion 41 defines a through opening 413. Four fixing portions 4111 are located on a bottom side of the recess portion 41.

The detaching member 51 includes an operating portion 511, a tab 513, and a connecting portion 515 connecting the operating portion 511 and the tab 513. The tab 513 is located in a plane substantially parallel to the operating portion 511. Two pivot holes 5151 are located on the connecting portion 511.

A mounting member 53 defines a cutout 533 and four mounting holes 531. A pair of pivot portions 537 is located in the mounting member 53.

Figure 3:
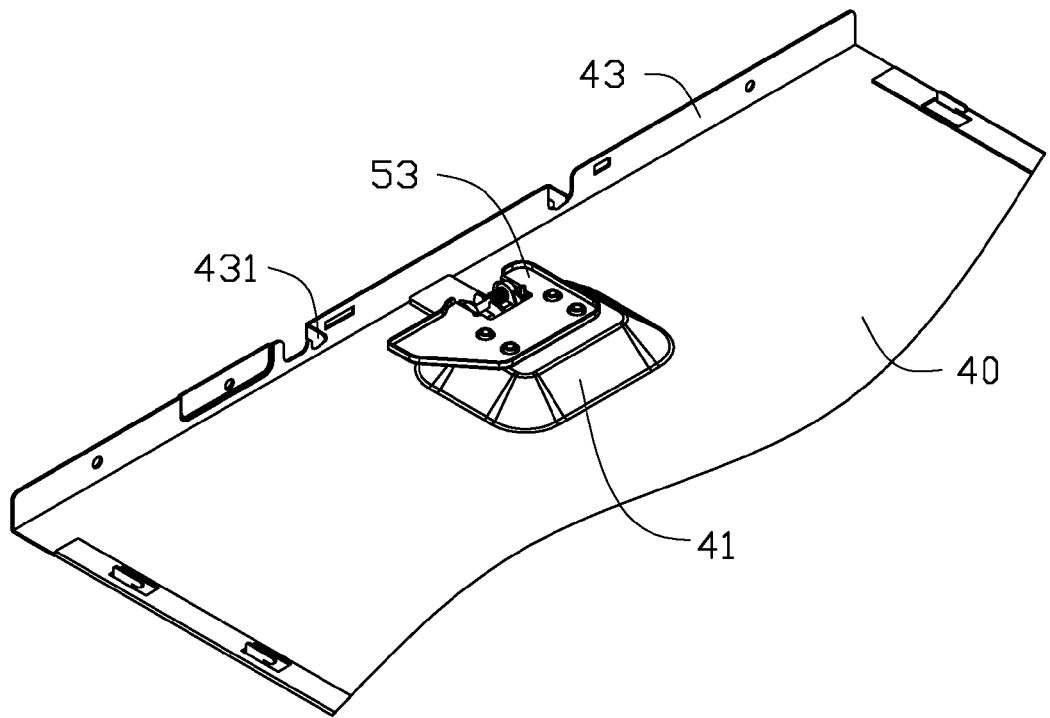
FIG. 3 is an assembly view of FIG. 2.

FIG. 3 illustrates an assembly of the mounting member 53 and the detaching member 51 to the top panel 40. The mounting member 53 is fixed to the bottom side of the recess portion 41 with the fixing portions 4111 interferingly engaged in the mounting holes 531 of the mounting member 53. The cutout 533 is aligned with the through opening 413. The detecting member 51 is located in the recess portion 41 with the tab 513 extending through the through opening 413. The pivot holes 5151 are aligned with the pivot portions 537. A pivot shaft 55 extends through the pivot holes 5151 and the pivot portions 537 with a coil spring 57 surrounding on the pivot shaft 55. The detaching member 51 then can be rotated about the pivot shaft 55.

Figure 5:
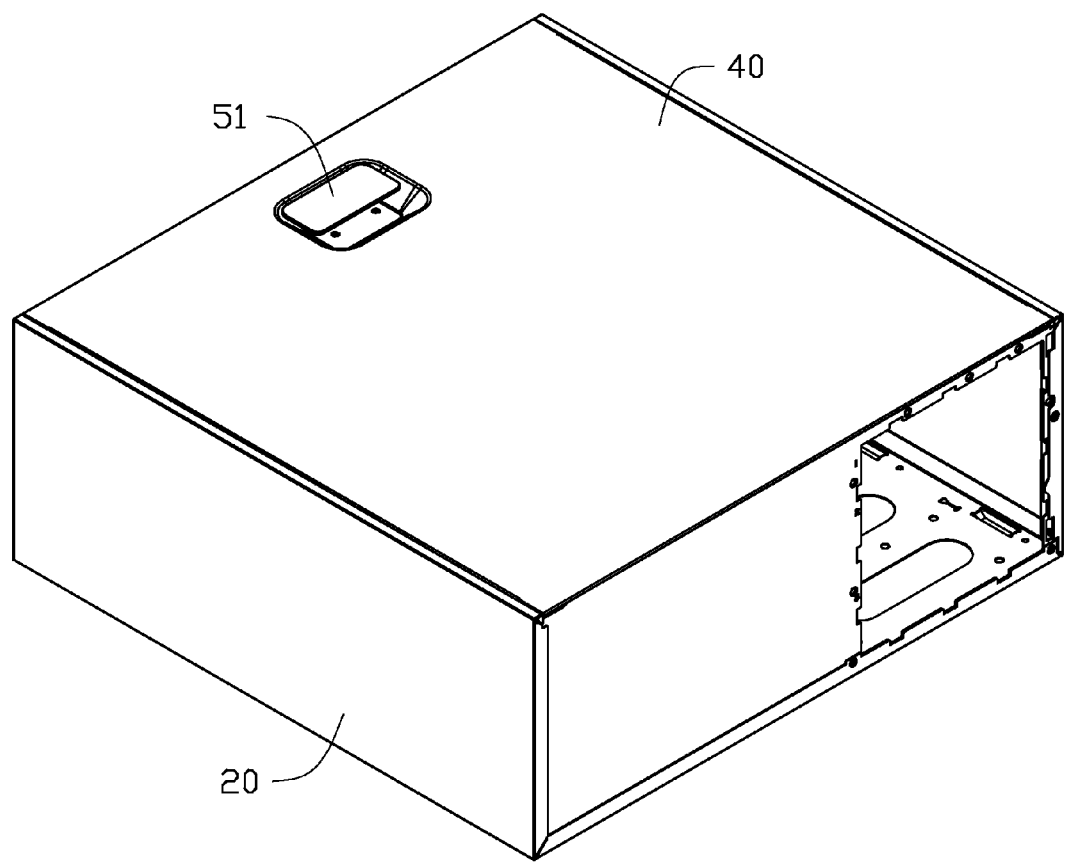
FIG. 5 is an assembled view of FIG. 1.
Figure 6:
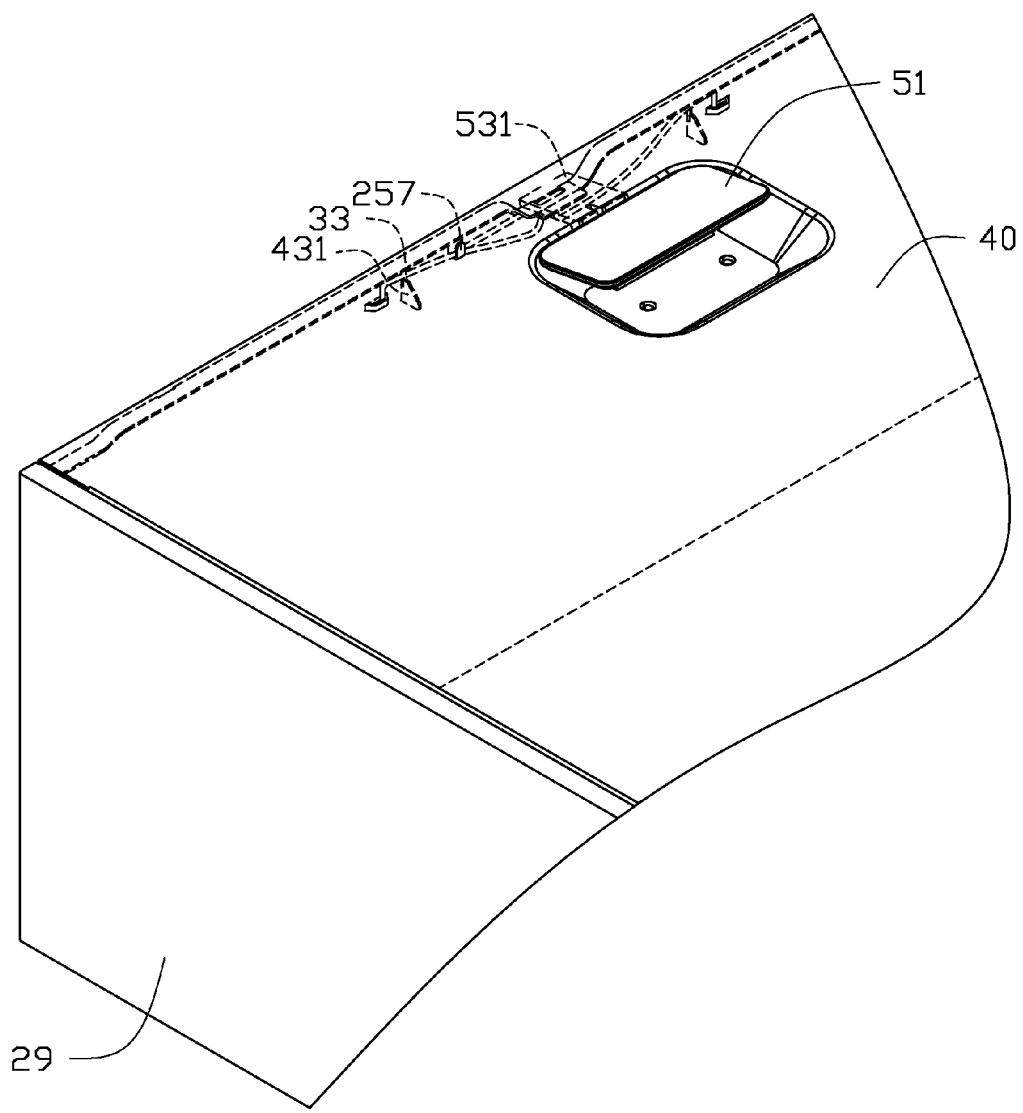
FIG. 6 is similar to FIG. 4, but showing an unlock state of the top panel.

Referring through FIG. 4 to FIG. 6, when assembling the chassis 20 and locking member 30, two hooking portions 35 are clasped on the two bridges 255. The engaging portions 33 are located on the lifting portions 257. The pressing portion 31 protrudes from a bottom portion of the recess 2511.

When assembling the top panel 40 to the chassis 20, the top panel 40 covers on the chassis 20 with the locking flange 43 located on a back side of the rear wall 25. The top panel 40 is moved towards the chassis 20. The hooks 431 extend into the corresponding locking holes 253 and hook the engaging portions 33 of the locking member 30. The tab 513 of the detaching member 51 is located in the recess 2511. The hooks 431 can prevent the top panel 40 from moving out of the chassis 20.

When detaching the top panel 40 from the chassis 20, the operating portion 511 is pulled upward. The tab 513 pushes the pressing portion 31 down to lift the engaging portions 33 away from the pressing portion 31 urged on the lifting portions 257. The engaging portions 33 are disengaged from the hooks 431. The top panel 40 with the hooks 431 is moved out of the chassis 20. The top panel 40 is detached from the chassis 20.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An enclosure comprising:
   a chassis comprising a rear wall;
   a locking member attached to the rear wall;
   a top panel attached to the chassis, the top panel comprising a hook, and a through opening being defined in the top panel; and
   a detaching member rotatable relative to the top panel, the detaching member comprising a tab and an operating portion, the detaching member extending through the through opening, and the tab and the operating portion being located at opposite sides of the top panel,
   wherein the hook is engaged with the locking member to prevent the top panel from moving from the chassis, and the tab is configured to urge the locking member to disengage the locking member from the hook;
   wherein the locking member comprises a pressing portion and an engaging portion, and the pressing portion protrudes upward from the engaging portion; and wherein a recess is defined in a top edge of the rear wall, and the pressing portion of the locking member is located in the recess when the pressing portion is biased by the tab.

2. The enclosure of claim 1, wherein a locking hole is defined in the rear wall for receiving the hook along a direction substantially perpendicular to the rear wall.

3. The enclosure of claim 1, wherein the rear wall comprises a lifting portion, and the lifting portion is configured to lift the locking member when the tab urges the locking member.

4. The enclosure of claim 3, wherein the tab and the hook are located on opposite sides of the lifting portion.

5. The enclosure of claim 1, wherein the locking member is linear.

6. The enclosure of claim 1, wherein a recess portion is defined in the top panel, and the detaching member is received in the recess portion before the tab urges the pressing portion.

7. The enclosure of claim 1, further comprising a mounting member mounted to an inner surface of the top panel, and the detaching member is pivotably attached to the mounting member.

8. The enclosure of claim 1, wherein the tab is located on a first plane, the operating portion is located in a second plane, and the first plane is substantially parallel to the second plane.

9. An enclosure comprising:
a chassis comprising a rear wall;
a locking member attached to the rear wall, the locking member comprising a pressing portion and an engaging portion;
a top panel attached to the chassis, the top panel comprising a hook, and a through opening being defined in the top panel; and
a detaching member attached to the top panel, the detaching member comprising a tab and an operating portion, the detaching member extending through the through opening, and the tab and the operating portion being located at opposite sides of the top panel,
wherein the hook is engaged with the engaging portion of the locking member to prevent the top panel from moving from the chassis, and
wherein when the locking member is disengaged from the top panel, the tab urges the locking member to disengage the locking member from the hook by moving the operating portion, the locking member is resiliently deformed, the pressing portion is pressed down, and the engaging portion is lifted up to disengage from the hook.

10. The enclosure of claim 9, wherein a locking hole is defined in the rear wall for receiving the hook along a direction substantially perpendicular to the rear wall.

11. The enclosure of claim 9, wherein the rear wall comprises a lifting portion, the lifting portion is configured to lift the locking member when the tab urges the locking member.

12. The enclosure of claim 11, wherein the tab and the hook are located on opposite sides of the lifting portion.

13. The enclosure of claim 9, wherein the locking member is linear.

14. The enclosure of claim 9, wherein a recess is defined in a top edge of the rear wall, and the pressing portion of the locking member is located in the recess before the pressing portion is urged by tab.

15. The enclosure of claim 9, wherein a recess portion is defined in the top panel, and the detaching member is received in the recess portion before the tab urges the pressing portion.

16. The enclosure of claim 9, further comprising a mounting member mounted to an inner surface of the top panel, and the detaching member is pivotably attached to the mounting member.

17. The enclosure of claim 9, wherein the tab is located on a first plane, the operating portion is located in a second plane, and the first plane is substantially parallel to the second plane.

* * * * *